UNITED STATES PATENT OFFICE.

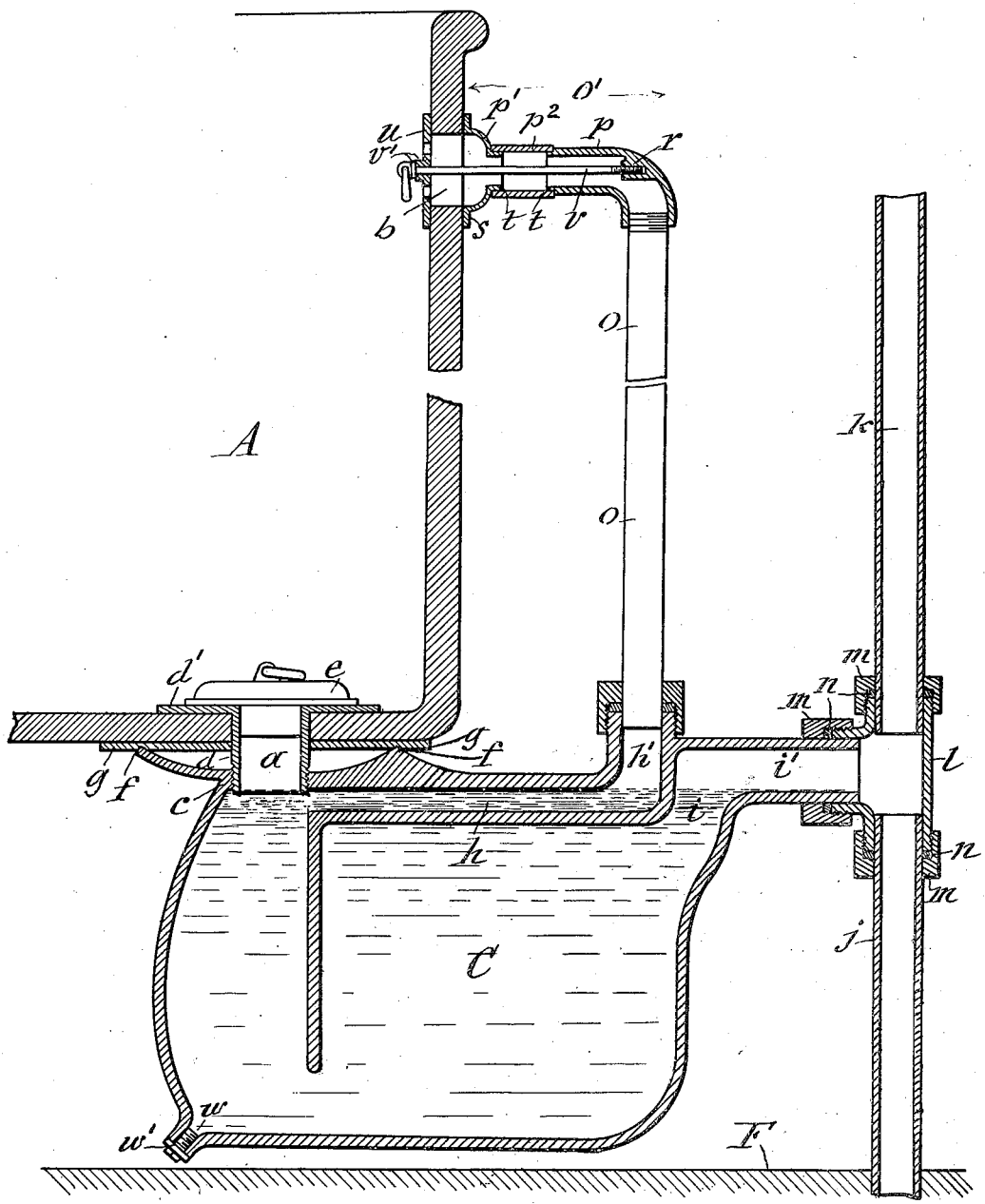

DUNCAN J. McINTYRE, OF SYRACUSE, NEW YORK.

TRAP, WASTE AND OVERFLOW PIPE ATTACHMENT TO BATH-TUBS.

952,081. Specification of Letters Patent. Patented Mar. 15, 1910.

Application filed June 17, 1907. Serial No. 379,313.

*To all whom it may concern:*

Be it known that I, DUNCAN J. MCINTYRE, a citizen of the United States, and resident of Syracuse, in the county of Onondaga, in the State of New York, have invented new and useful Improvements in Trap, Waste and Overflow Pipe Attachments to Bath-Tubs, of which the following, taken in connection with the accompanying drawings, is a full, clear, and exact description.

This invention is designed for connecting traps to the bottom of bath-tubs which are composed of cast iron. And the invention consists in the novel construction of the trap and its attachment to the bath-tub as hereinafter described and claimed.

The accompanying drawing illustrates a vertical transverse section of the part of a bath-tub to which my invention is applied.

In the said drawings —A— represents the bath-tub, which is provided with the usual outlet —a— in its bottom near one end of the tub, and with the over-flow-port —b— in the upper part of said end of the tub. Said tub is suitably supported at a sufficient elevation from the supporting floor —F— to permit the trap —C— to be interposed between said floor and bottom of the tub. This trap is elongated horizontally to extend some distance under the tub and beyond the end thereof. Said trap is constructed complete and separate from the bath-tub.

The top plate of the trap is provided with a threaded inlet —c— into which is screwed the correspondingly threaded lower end of the nozzle —d—, which passes through the outlet —a— of the tub and is provided on its upper end with a flange —$d^1$— by which it is seated on the bottom of the interior of the tub.

—e— denotes the usual stopper for closing the nozzle when the tube is in use.

The top of the trap is formed with an upwardly projecting rim —f— surrounding the nozzle and engaging a gasket —g— placed on the underside of the tub to form a watertight connection between the trap and tub and also providing an air chamber therebetween. The underside of the top plate of the trap is formed with a horizontal duct —h— which communicates at one end with the lower end of the nozzle —d— and has its opposite end formed with an upward extension —$h^1$— which communicates with the overflow of the tub. It will be noted that the annular rim f is formed integral with the top of the trap and that said rim is provided with a sharp edged upper periphery adapted to seat into the gasket g as clearly shown in the drawing, said operation taking place upon tightening the screw connection between the nozzle d and the threaded inlet c of the trap. The top of the trap is also formed with an upwardly extending throat —i— located preferably beyond the duct-extension —$h^1$—. From the top of said throat extends the outlet duct —$i^1$— and this is connected to the waste-pipe —j— which leads to the sewer.

The interior bottom of the outlet duct —$i^1$— is in a line slightly above the top of the duct —h— to form a water seal across the duct extension —$h^1$—, and across the throat —i—.

Above the waste-pipe —j— and preferably in line therewith is the air vent pipe —k—. Said pipes are connected to opposite ends of the vertical branch of a T-coupling —l—, the intermediate horizontal branch of said coupling is connected to the end of the outlet duct —$i^1$—. Said connections I preferably make by inserting the ends of the pipes —j— and —k— into the coupling —l— and applying to the ends of said coupling screw-caps —m—m— engaging the screw-threads on the exterior of the coupling. Between the ends of the coupling —l— and the aforesaid screw-caps are placed suitable gaskets —n—n— to render the connections air-tight.

—o— represents the over-flow pipe which is connected at its lower end to the hereinbefore mentioned duct-extension —$h^1$— in substantially the same manner as the aforesaid connection of the pipes —j— and —k— to the T-coupling —l—. The pipe —o— thus communicates with the trap through the duct —h—.

The upper end portion of the over-flow pipe —o— consists of a horizontal extension —$o^1$— which is connected to the exterior of the bath-tub —A— and communicates with the interior of the tub through the over-flow port —b—. To render the horizontal end portion —$o^1$— of the overflow pipe longitudinally adjustable to varying distances between the over-flow port —b— of the tub and the point of connection of said pipe to the trap, I form the said pipe-extension of sections —p—$p^1$— and —$p^2$— adjustably spliced end to end. The section —p— consists of an elbow fastened to the upper end of the vertical pipe —o— and formed with a screw-threaded socket —r— on its interior.

The pipe-section —p¹— is seated on the exterior of the tub and is formed with a flange —s— surrounding the over-flow port —b—. Between the sections —p— and —p¹— is interposed the section —p²— which is slipped with its ends onto flanges —t— on the adjacent ends of the sections —p— and —p¹— and is thus sustained in line therewith.

On the inner side of the tub —A— is placed the strainer plate —u— provided with a central aperture through which passes a rod —v— provided on its outer end with a head —v¹— bearing on the plate —u—, and has its inner end threaded and entering into the socket —r— and thus tying the sections —p—p¹—p²— together and to the exterior of the bath-tub.

The length of the aforesaid horizontal end-extension —o¹— of the over-flow pipe is adjusted by varying the length of the interposed section —p²—. —w— designates a water-outlet provided in the bottom of the trap for emptying the trap when necessary. Said outlet is threaded internally and provided with a screw-threaded stopper —w¹—.

What I claim as my invention is:—

1. A trap disposed under the bottom of a bath-tub and formed with its top plate separate from the tub and provided in said top plate with a threaded inlet for attachment to the threaded end of the discharge nozzle of the tub, a horizontal duct formed on the underside of the top plate and communicating at one end with the lower end of the aforesaid nozzle and formed at the opposite end with an upward extension communicating with the overflow of the tub the trap provided with an outlet duct disposed with the bottom of its interior in a line above the top of said horizontal duct, the top plate of the trap being formed with an upwardly projecting rim surrounding the discharge nozzle, and a gasket interposed between the said rim and bottom of the tub as set forth, and said rim provided with a sharpened top edge seated within the body of the member disposed thereabove and contacted thereby.

2. A trap disposed under the bottom of a bath-tub and connected to the discharge nozzle of the tub and formed with a horizontal duct extending through the top of the trap and normally filled with water, the top of said trap provided with an upwardly projecting integral rim surrounding the nozzle and contacting the tub bottom providing an air chamber between said tub and trap, an outlet duct provided for the trap and normally free from water, and said rim provided with a sharpened top edge seated within the body of the member disposed thereabove and contacted thereby.

DUNCAN J. McINTYRE.

In presence of—
F. N. POTTER,
J. J. LAASS.